United States Patent
Gao et al.

(10) Patent No.: US 11,300,440 B2
(45) Date of Patent: Apr. 12, 2022

(54) METHOD AND SYSTEM FOR DETERMINING THE WEIGHT OF A LOAD ON A CHASSIS

(71) Applicant: BlackBerry Limited, Waterloo (CA)

(72) Inventors: Yu Gao, Waterloo (CA); Mahendra Fuleshwar Prasad, Waterloo (CA); Scott Leonard Dill, Paris (CA); Jason Wayne Jantzi, St. Clements (CA); Shouxing Qu, Gloucester (CA)

(73) Assignee: BlackBerry Limited, Waterloo (CA)

( * ) Notice: Subject to any disclaimer, the term of this patent is extended or adjusted under 35 U.S.C. 154(b) by 145 days.

(21) Appl. No.: 16/683,612

(22) Filed: Nov. 14, 2019

(65) Prior Publication Data
US 2021/0148749 A1   May 20, 2021

(51) Int. Cl.
*G01G 3/08*  (2006.01)
*G01G 19/08* (2006.01)
*G01G 23/42* (2006.01)

(52) U.S. Cl.
CPC ............ *G01G 3/08* (2013.01); *G01G 19/08* (2013.01); *G01G 23/42* (2013.01)

(58) Field of Classification Search
CPC .......... G01G 3/08; G01G 19/08; G01G 23/01; G01G 23/42
See application file for complete search history.

(56) References Cited

U.S. PATENT DOCUMENTS

| 3,428,139 | A | * | 2/1969 | Nolan | ..................... G01S 15/88 |
| | | | | | 177/137 |
| 3,648,790 | A | | 3/1972 | Bishop | |
| 3,857,093 | A | | 12/1974 | Green | |
| 3,955,636 | A | | 5/1976 | Askew | |

(Continued)

FOREIGN PATENT DOCUMENTS

| EP | 2131167 A1 | 12/2009 |
| JP | 2007155410 | 12/2005 |
| KR | 20040088251 A | 10/2004 |

OTHER PUBLICATIONS

EPO: Extended European Search Report relating to EP application No. 20200178.0, dated Mar. 19, 2021.

*Primary Examiner* — Randy W Gibson
(74) *Attorney, Agent, or Firm* — Rowand LLP

(57) ABSTRACT

A method and system for determining the weight of a load when the load is placed on a chassis supported by a spring suspension. The method comprises measuring a first distance to a position fixed relative the ground by at least one sensor mounted on the chassis; detecting a displacement of the chassis relative to the position based on the first distance and a second distance measured to the position by the at least one sensor; determining the weight of the load on the basis of the chassis displacement; and communicating the determined weight of the load. The system comprises at least one sensor mounted on the chassis for measuring a first distance to a position fixed relative to the ground; a module for detecting a displacement of the chassis relative to the (Continued)

400 position based on the first distance and a second distance measured to the position by the at least one sensor, the module determining the weight of the load on the basis of the chassis displacement; and a communication module for communicating the determined weight of the load.

22 Claims, 4 Drawing Sheets

(56) References Cited

U.S. PATENT DOCUMENTS

| | | | |
|---|---|---|---|
| 4,375,839 A | 3/1983 | Manning et al. | |
| 4,412,298 A * | 10/1983 | Feinland | G01G 23/3707 |
| | | | 177/25.14 |
| 4,623,029 A | 11/1986 | Bambauer et al. | |
| 5,327,347 A * | 7/1994 | Hagenbuch | G07C 5/008 |
| | | | 701/50 |
| 5,410,109 A | 4/1995 | Tarter et al. | |
| 5,603,556 A * | 2/1997 | Klink | B60T 8/1837 |
| | | | 303/198 |
| 5,735,580 A | 4/1998 | Klink | |
| 6,259,041 B1 | 7/2001 | Dohrmann | |
| 6,384,349 B1 * | 5/2002 | Voll | G01G 19/10 |
| | | | 177/137 |
| 7,477,758 B2 * | 1/2009 | Piirainen | B60J 10/00 |
| | | | 382/100 |
| 8,570,183 B2 * | 10/2013 | Corrado | G01S 15/88 |
| | | | 340/666 |
| 9,085,203 B2 * | 7/2015 | Duppong | G01G 19/08 |
| 11,077,730 B2 * | 8/2021 | Froehlich | B60D 1/36 |
| 2004/0102907 A1 * | 5/2004 | Lueschow | G01G 19/08 |
| | | | 702/33 |
| 2011/0248861 A1 | 10/2011 | Corrado | |
| 2017/0254694 A1 | 9/2017 | Toigo | |
| 2021/0186241 A1 * | 6/2021 | Kramer | A47G 19/2227 |

* cited by examiner

400

METHOD AND SYSTEM FOR DETERMINING THE WEIGHT OF A LOAD ON A CHASSIS

FIELD

The present application generally relates to weight estimation, and more particularly, to methods and systems for determining the weight of a load on a chassis supported by a spring suspension.

BACKGROUND

In the intermodal shipping industry, it is very valuable for customers to know when a shipping container is placed on or off the chassis and the weight of the load. This knowledge allows efficiency of the fleet to be evaluated and optimized thereby resulting in cost and time savings. Today's operations use large scales and container handling equipment (e.g. weighbridges, cranes) to find out the total weight of shipping containers. This method is cumbersome, expensive and has potential for errors. Availability of such scales is also poor. Thus, there is a need for improved ways of detecting shipping containers and estimating their weight.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
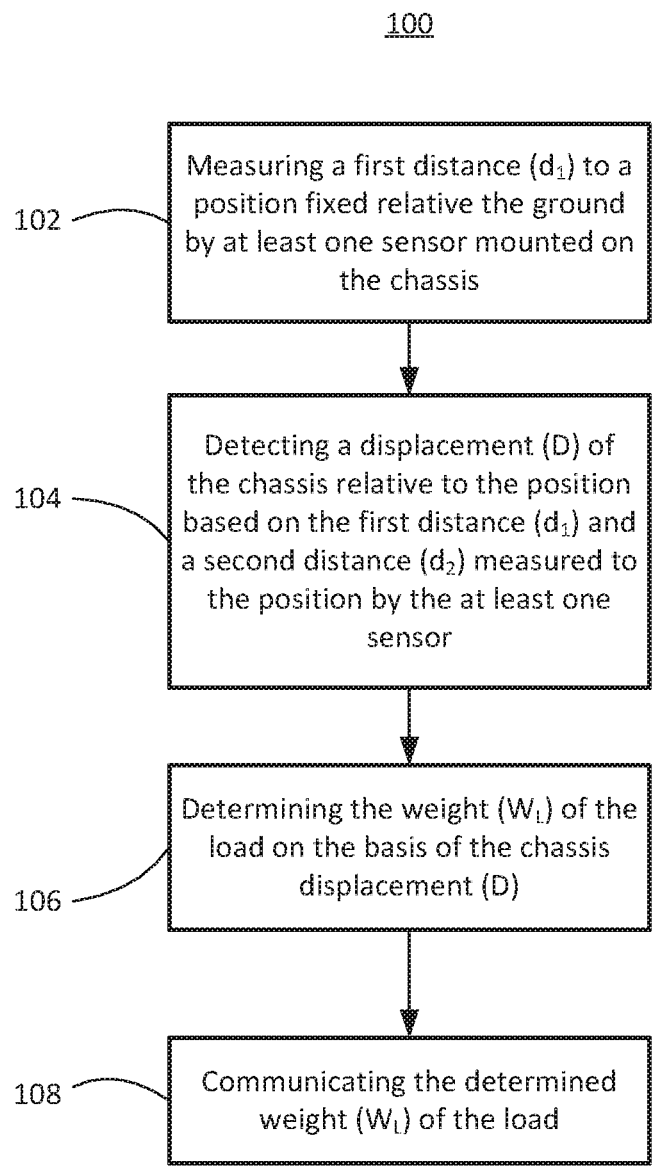
FIG. 1 shows, in flowchart form, an example method of determining the weight of a load when the load is placed on a chassis supported by a spring suspension.

In a first aspect, the present application describes a method of determining the weight of a load when the load is placed on a chassis supported by a spring suspension. The method may include measuring a first distance ($d_1$) to a position fixed relative the ground by at least one sensor mounted on the chassis; detecting a displacement (D) of the chassis relative to the position based on the first distance ($d_1$) and a second distance ($d_2$) measured to the position by the at least one sensor; determining the weight ($W_L$) of the load on the basis of the chassis displacement (D); and communicating the determined weight ($W_L$) of the load.

In some implementations, the at least one sensor is one of: a millimeter wave (mmWave) radar, an ultrasonic transducer, or a time-of-flight (ToF) sensor.

In some implementations, measuring the first distance ($d_1$) to the position occurs when the at least one sensor is initially mounted on the chassis, and the first distance ($d_1$) is stored in a memory.

In some implementations, communicating the determined weight ($W_L$) of the load includes wirelessly transmitting the determined weight ($W_L$) to a server.

In one implementation, the chassis is supported by a multi-leaf spring suspension, and determining the weight ($W_L$) of the load on the basis of the chassis displacement (D) includes applying the function $W_L = aD^2 + bD + c$, where a, b and c are coefficients characteristic of the multi-leaf spring suspension.

In yet a further implementation, the coefficients characteristic of the multi-leaf spring suspension are derived from a chassis characterization training process.

In other implementations, prior to determining the weight ($W_L$) of the load, determining the presence of the load by determining that the magnitude of the chassis displacement (D) is greater than a minimum displacement value.

In some implementations, the load is a shipping container, and the method may include: determining the presence of a load contents inside the shipping container by determining that the determined weight ($W_L$) of the load is greater than an unloaded weight ($W_u$) of the shipping container; and determining the weight of the load contents by subtracting the unloaded weight ($W_u$) of the shipping container from the determined weight ($W_L$) of the load.

In some implementations, the load is a load contents inside a shipping container permanently affixed to the chassis, and the method may include: determining the presence of the load contents by determining that the determined weight ($W_L$) of the load is greater than an unloaded weight ($W_u$) of the shipping container; and determining the weight of the load contents by subtracting the unloaded weight ($W_u$) of the shipping container from the determined weight ($W_L$) of the load.

In a particular implementation, the chassis is a rail car chassis, and the position is a point on a railroad track.

In one implementation, the position is a point on the ground.

In another implementation, the position is a chassis structure, and the measuring is contactless.

In a second aspect, the present application describes a system for determining the weight of a load when the load is placed on a chassis supported by a spring suspension. The system may include: at least one sensor mounted on the chassis for measuring a first distance ($d_1$) to a position fixed relative the ground; a module for detecting a displacement (D) of the chassis relative to the position based on the first distance ($d_1$) and a second distance ($d_2$) measured to the position by the at least one sensor, the module determining the weight ($W_L$) of the load on the basis of the chassis displacement (D); and a communication module for communicating the determined weight ($W_L$) of the load.

In some implementations, the at least one sensor is one of: a millimeter wave (mmWave) radar, an ultrasonic transducer, or a time-of-flight (ToF) sensor.

In some implementations, measuring the first distance ($d_1$) to the position occurs when the at least one sensor is initially mounted on the chassis, and the first distance ($d_1$) is stored in a memory.

In some implementations, communicating the determined weight ($W_L$) of the load includes wirelessly transmitting the determined weight to a server.

In one implementation, the chassis is supported by a multi-leaf spring suspension, and the module determines the weight ($W_L$) of the load on the basis of the chassis displacement (D) by applying the function $W_L = aD^2 + bD + c$, where a, b and c are coefficients characteristic of the multi-leaf spring suspension.

In yet a further implementation, the coefficients characteristic of the multi-leaf spring suspension are derived from a chassis characterization training process.

In other implementations, the module may determine, prior to determining the weight ($W_L$) of the load, the presence of the load on the basis of the chassis displacement (D) by determining that the magnitude of the chassis displacement (D) is greater than a minimum displacement value.

In some implementations, the load is a shipping container, and the module may: determine the presence of a load contents inside the shipping container by determining that the determined weight ($W_L$) of the load is greater than an unloaded weight ($W_u$) of the shipping container; and determine the weight of the load contents by subtracting the unloaded weight ($W_u$) of the shipping container from the determined weight ($W_L$) of the load.

In some implementations, the load is a load contents inside a shipping container permanently affixed to the chassis, and the module may: determine the presence of the load contents by determining that the determined weight ($W_L$) of the load is greater than an unloaded weight ($W_u$) of the shipping container; and determine the weight of the load contents by subtracting the unloaded weight ($W_u$) of the shipping container from the determined weight ($W_L$) of the load.

In a particular implementation, the chassis is a rail car chassis, and the position is a point on a railroad track.

In one implementation, the position is a point on the ground.

In another implementation, the position is a chassis structure, and the measuring is contactless.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

According to Hooke's law, the force (F) needed to extend or compress a spring by some distance (x) scales linearly with respect to that distance. That is: F=kx, where k is a constant factor characteristic of the spring (its stiffness) and x is a small distance compared to the total possible deformation of the spring. Chassis suspension springs are equivalent to a big spring system to which Hooke's law is applied. A distance/range sensor can detect the distance change between the chassis frame to the ground or fixed point when a container is placed on the chassis. Therefore, with a known k factor, the weight of the container (plus load) can be estimated.

As noted above, current methods of weighing shipping containers make use of large truck scales and container handling equipment. Truck scale charges can add up to high operating costs over time. This can be due to costs associated with weighing stations and container handling equipment. Furthermore, weighing containers on truck scales has potential for errors and inaccurate measurements.

Accordingly, in accordance with one aspect of the present application, a method of determining the weight of a load when the load is placed on a chassis supported by a spring suspension is described. The method, in one example implementation, communicates a determined weight of a load. It does so by measuring a first distance to a position fixed relative to the ground by at least one sensor mounted on the chassis, detecting a displacement of the chassis relative to the position based on the first distance and a second distance measured to the position, determining the weight of the load on the basis of the chassis displacement, and communicating the determined weight.

Reference is first made to FIG. 1, which shows an example method 100 of determining the weight of a load when the load is placed on a chassis supported by a spring suspension. The method 100 may be carried out by an independent chassis-mounted system in conjunction with a user (handheld) device. Additionally, or alternatively, the method 100 may be carried out by a chassis-mounted system in conjunction with a remote server.

At operation 102, the method measures a first distance ($d_1$) to a position fixed relative the ground by at least one sensor mounted on the chassis. The at least one sensor may be any type of suitable sensor, such as a millimeter wave (mmWave) radar, an ultrasonic transducer, or a time-of-flight (ToF) sensor. In one example embodiment, measuring the first distance ($d_1$) to the position occurs initially when the at least one sensor is mounted on the chassis. This initial first distance ($d_1$) is stored in memory for later retrieval. Alternatively, measurement of the first distance ($d_1$) to the position may occur on-demand when the presence and/or weight of the load is requested.

At operation 104, the method detects a displacement (D) of the chassis relative to the position based on the first distance ($d_1$) and a second distance ($d_2$) measured to the position by the at least one sensor. In some embodiments, when the presence and/or weight of the load is requested, a second or subsequent distance measurement to the position is taken. The displacement (D) is derived from the difference between the first distance ($d_1$) to the position and the second distance ($d_2$) to the position (i.e. D=$d_1$-$d_2$). As noted previously, the first distance ($d_1$) may be saved in memory at an initial stage, in which case the first distance ($d_1$) is retrieved from memory. In one example embodiment, the presence of the load on the chassis may be positively determined prior to determining the weight of the load if the magnitude of the chassis displacement (D) is greater than a minimum displacement value. The minimum displacement value may be zero or some other predetermined value. It may be that the load is a shipping container which is already placed on the chassis when a magnitude of the chassis displacement (D) is determined to be greater than a minimum displacement value. It may also be that the load is a load contents inside a shipping container permanently affixed to the chassis, such as, for example, in the case of a truck trailer or dry van. In both these two scenarios the positive chassis displacement (D) indicates the presence of load contents inside the shipping container. In another example embodiment, the displacement (D) is continuously or periodically monitored, and that only if D exceeds the minimum displacement value does the method proceed with subsequent operations.

At operation 106, the method determines the weight ($W_L$) of the load on the basis of the chassis displacement (D). As further discussed below, the presence of the load may be determined as a function of a positive chassis displacement (D). The determined (total) weight ($W_L$) of the load is also calculated as a function of the displacement (D) in addition to certain factors specific to the chassis (see discussion of FIG. 5). In some embodiments, the presence and weight of load contents inside a shipping container may be determined. For example, the presence of load contents inside the shipping container may be determined by determining that the determined weight ($W_L$) of the load is greater than an unloaded weight ($W_u$) of the shipping container. In another example, the weight of the load contents inside the shipping container may be determined by subtracting the unloaded weight ($W_u$) of the shipping container from the determined weight ($W_L$) of the load. These last two examples presuppose that the unloaded weight ($W_u$) of the specific shipping container (or class of containers) is known or provided.

At operation 108, the method communicates the determined weight ($W_L$) of the load. In one example embodiment, communicating the determined information includes wirelessly transmitting the determined weight ($W_L$) of the load to a server. It may be that the information gets reported directly to a remote server via a wireless network. Alternatively, the information may be relayed to a remote server via a gateway device (see discussion of FIG. 6).

Figure 2:
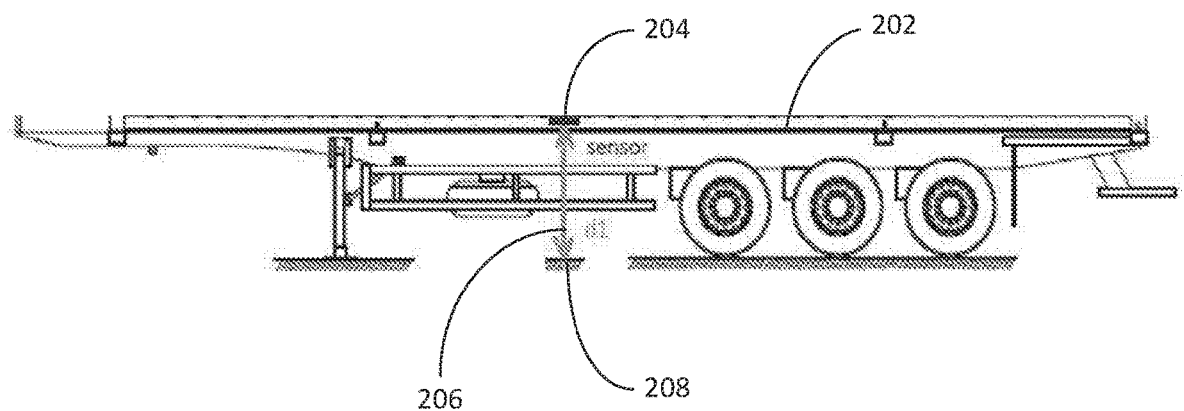
FIG. 2 illustrates, in schematic form, an example unloaded vehicle chassis.

Reference is now made to FIG. 2 which illustrates an example vehicle chassis 202 without any load. The vehicle chassis 202 includes a suspension having suspension springs (not shown) at each axle. A sensor 204 is mounted directly to the vehicle chassis 202 in a downward facing orientation. The sensor 204 is located in any suitable position so as to ensure a clear path to a position fixed relative to the ground. The vehicle may be any transport vehicle, such as a transport truck, and the fixed position may be a point on the ground 208. In one embodiment, the chassis belongs to a rail car and the fixed position is a point on a railroad track. In another embodiment, the fixed position is a chassis structure (e.g. frame) that remains fixed relative to the ground. In the case of using a chassis structure, the measuring of distances by the sensor is contactless. Put another way, there are no fixtures or components between the chassis and chassis structure (i.e. joining or connecting therebetween) other than the chassis-mounted sensor. As shown in FIG. 2, the chassis-mounted sensor 204 measures a first distance ($d_1$) 206 to the point on the ground 208, unless, as previously mentioned, $d_1$ is being retrieved from memory based on an earlier measurement.

Figure 3:
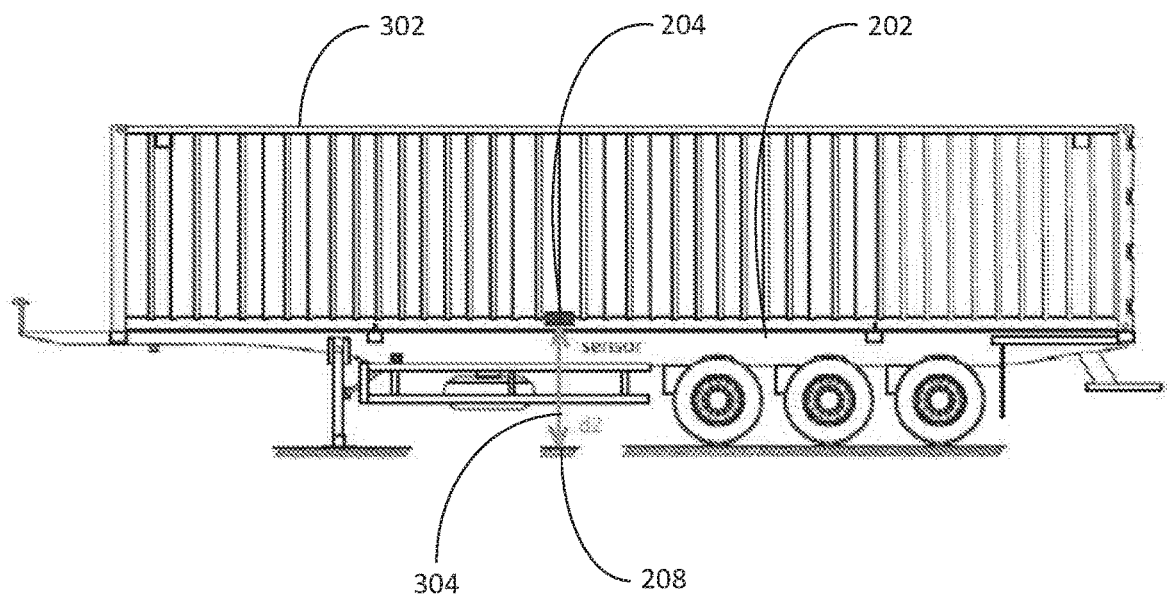
FIG. 3 illustrates, in schematic form, the example vehicle chassis of FIG. 2 loaded with a shipping container.

Reference is now made to FIG. 3 which illustrates the same vehicle chassis 202 of FIG. 2 now loaded with a shipping container 302. The chassis-mounted sensor 204 measures a second distance ($d_2$) 304 to the ground 208. Subsequently, the chassis displacement (D) relative to the ground 208 is detected and may be calculated as $D=d_1-d_2$. As previously discussed, in one example, determining the presence of the load (shipping container and/or load contents) on the basis of the chassis displacement (D) includes determining that the magnitude of the chassis displacement (D) is greater than a minimum displacement value. The minimum displacement value may be zero or some other predetermined value. If the displacement (D) of the chassis is less than the minimum displacement value, then no container or load was placed upon it. It follows, therefore, that if the displacement (D) is negative (i.e. $d_2$ is measured as larger than $d_1$) then it may be concluded that a container and/or its load was removed from the chassis.

Figure 4:
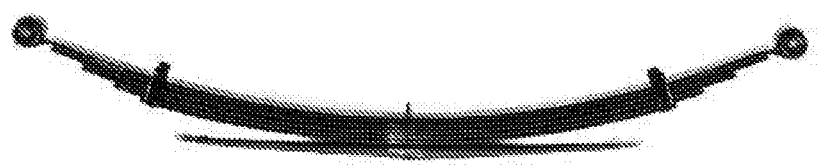
FIG. 4 depicts an example multi-leaf spring as used in a transport vehicle chassis suspension.

FIG. 4 depicts an example multi-leaf spring 400 as is commonly used in transport vehicle chassis suspensions.

Figure 5:
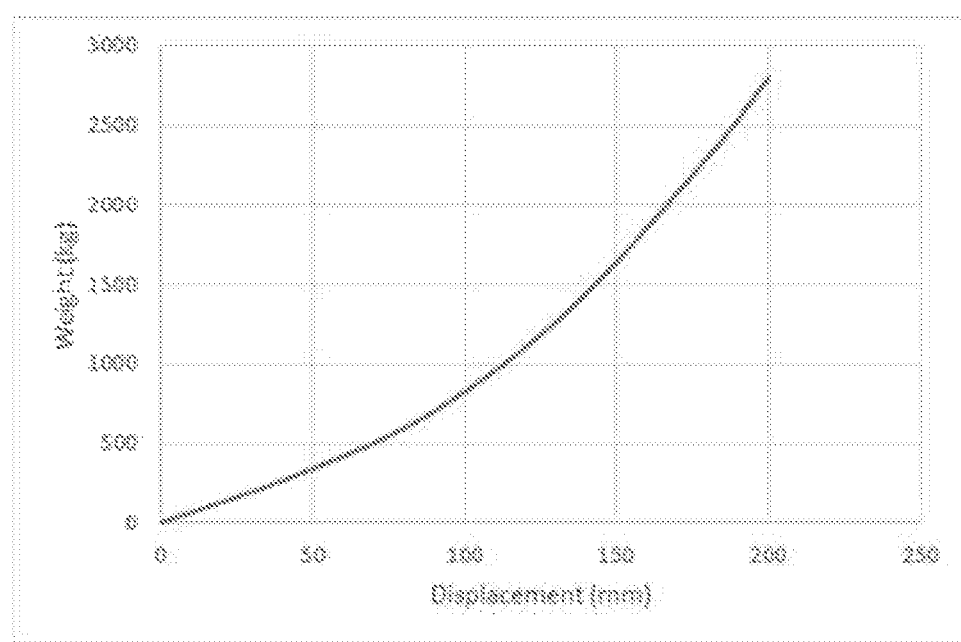
FIG. 5 illustrates an example graph of weight vs. displacement for a typical chassis multi-leaf spring suspension.

Reference is now made to FIG. 5, which illustrates an example graph of weight vs. displacement for a typical chassis multi-leaf spring suspension. The suspension may include multi-leaf springs as depicted in FIG. 4. In an example embodiment, determining the weight ($W_L$) of the load on the basis of the chassis displacement (D) includes applying the 2nd order best fit function $W_L=aD^2+bD+c$, where a, b and c are coefficients characteristic of the multi-leaf spring suspension. The coefficients may, for example, be obtained from a provided model for the particular suspension. Such provided model may take into account the age or other characteristics of the suspension springs. Additionally, or alternatively, the coefficients may be derived from a chassis characterization training process. Such training process may entail loading/unloading candidate springs in a controlled environment and deriving mathematical coefficients modelling spring stiffness (i.e. compression and rebound). Using the graph of FIG. 5 and its associated function $W_L=0.057D^2+2.384D+26.078$, an example displacement D=180 mm (after a shipping container is mounted on the chassis) results in an estimated container weight $W_L=2302.03$ kg.

Figure 6:
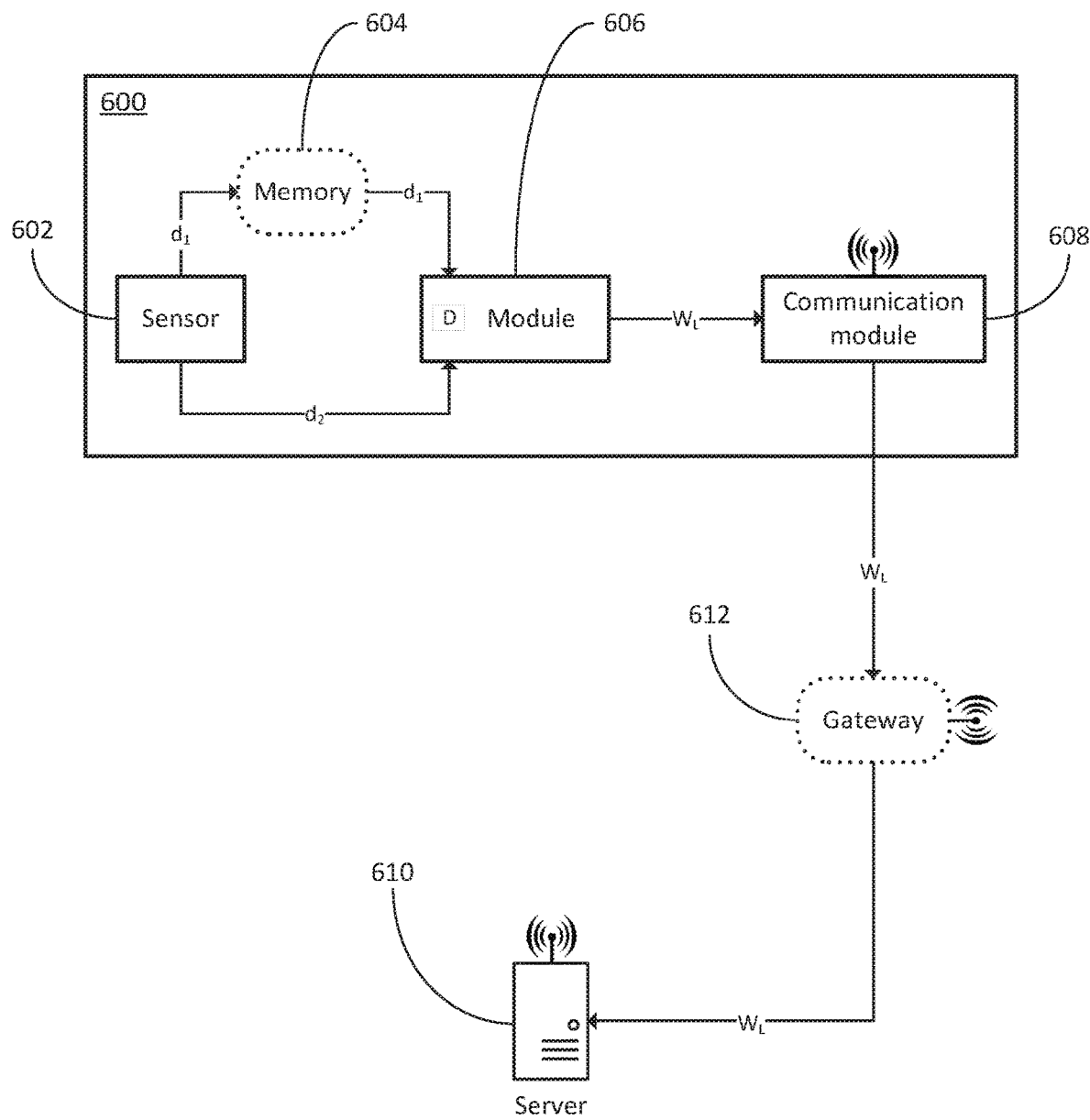
FIG. 6 depicts, in block diagram form, an example system for determining the weight of a load when the load is placed on a chassis supported by a spring suspension.

Reference is now made to FIG. 6 which depicts an example system 600 for determining the weight of a load when the load is placed on a chassis supported by a spring suspension. As noted above, the system may be a standalone system, or, as in this example, the chassis-mounted system 600 may work in conjunction with a remote server 610. The system 600 first receives a command to determine the weight of the load when the load is placed on the chassis. In response, at least one sensor 602 mounted on the chassis measures a first distance ($d_1$) to a position fixed relative the ground and provides it to module 606. The at least one sensor may be any one of: a millimetre wave (mmWave) radar, an ultrasonic transducer, or a time-of-flight (ToF) sensor. In one example embodiment, measuring the first distance ($d_1$) to the position occurs when the at least one sensor 602 is initially mounted on the chassis, and the first distance ($d_1$) is stored in a memory 604. Thus, in this example, the at least one sensor 602 does not measure a first distance ($d_1$) to the position but instead the module 606 retrieves $d_1$ from memory 604 (having been previously saved in memory 604). Irrespective of whether $d_1$ is measured or retrieved, the module 606 then detects a displacement (D) of the chassis relative to the position based on the first distance ($d_1$) and a second distance ($d_2$) measured to the position by the at least one sensor 602. A minimum displacement value may also be stored in memory 604. It may also be that the displacement (D) is continuously or periodically monitored, and that only if D exceeds the minimum displacement value does the module 606 proceed with determining the load presence and/or weight. Next, the module 606 determines the presence and/or weight ($W_L$) of the load, as described above, on the basis of the chassis displacement (D), and provides the determined presence and/or weight ($W_L$) to communication module 608. The module 606 may compare the detected displacement (D) to the stored minimum displacement value in determining the presence (or lack thereof) of the load. Finally, communication module 608 communicates the determined weight ($W_L$) of the load. It is noted that, in some embodiments, communication module 608 communicates the determined information by wirelessly transmitting it directly to a (remote)

server 610. In other embodiments, the information may be relayed to the server 610 via a gateway 612. It may be that communication module 608 connects to gateway 612 using any low power/low data rate protocol, such as Sub-GHz radio or Bluetooth Low Energy (BLE), for example. In some examples, the system 600 may determine the presence and/or weight of load contents inside a shipping container by comparing the determined weight ($W_L$) of the load to an unloaded weight ($W_u$) of the shipping container. Such unloaded weight ($W_u$) of the shipping container may be stored in the memory 604 along with first measured distance ($d_1$). Additionally, or alternatively, $W_u$ may be received from the server 610. Further, chassis characterization models/coefficients may also be received from the server 610 and stored in the memory 604 for use by the module 606 in determining the presence and weight ($W_L$) of the load.

Example embodiments of the present application are not limited to any particular operating system, system architecture, mobile device architecture, server architecture, or computer programming language.

It will be understood that the applications, modules, routines, processes, threads, or other software components implementing the described methods or processes may be realized using standard computer programming techniques and languages. It will be further understood that the modules implementing the described systems may be realized using one or more standard data processors or processor-executable instructions stored upon such processors. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of determining the weight of a load when the load is placed on a chassis supported by a spring suspension, the method comprising:
measuring a first distance ($d_1$) to a position fixed relative to the ground by at least one sensor mounted on the chassis,
wherein the sensor is a millimeter wave (mmWave) radar, and wherein the position is a chassis structure that remains fixed under load;
detecting a displacement (D) of the chassis relative to the position based on the first distance ($d_1$) and a second distance ($d_2$) measured to the position by the at least one sensor;
determining the weight ($W_L$) of the load on the basis of the chassis displacement (D); and
communicating the determined weight ($W_L$) of the load.

2. The method of claim 1, wherein measuring the first distance ($d_1$) to the position occurs when the at least one sensor is initially mounted on the chassis, and the first distance ($d_1$) is stored in a memory.

3. The method of claim 1, wherein communicating the determined weight ($W_L$) of the load includes wirelessly transmitting the determined weight to a server.

4. The method of claim 1, wherein the chassis is supported by a multi-leaf spring suspension, and wherein determining the weight ($W_L$) of the load on the basis of the chassis displacement (D) includes applying the function $W_L = aD^2 + bD + c$, where a, b and c are coefficients characteristic of the multi-leaf spring suspension.

5. The method of claim 4, wherein the coefficients characteristic of the multi-leaf spring suspension are derived from a chassis characterization training process.

6. The method of claim 1, the method further comprising, prior to determining the weight ($W_L$) of the load, determining the presence of the load by determining that the magnitude of the chassis displacement (D) is greater than a minimum displacement value.

7. The method of claim 6, wherein the load is a shipping container, the method further comprising:
determining the presence of a load contents inside the shipping container by determining that the determined weight ($W_L$) of the load is greater than an unloaded weight ($W_u$) of the shipping container; and
determining the weight of the load contents by subtracting the unloaded weight ($W_u$) of the shipping container from the determined weight ($W_L$) of the load.

8. The method of claim 6, wherein the load is a load contents inside a shipping container permanently affixed to the chassis, the method further comprising:
determining the presence of the load contents by determining that the determined weight ($W_L$) of the load is greater than an unloaded weight ($W_u$) of the shipping container; and
determining the weight of the load contents by subtracting the unloaded weight ($W_u$) of the shipping container from the determined weight ($W_L$) of the load.

9. The method of claim 1, wherein the chassis is a rail car chassis, and wherein the position is a point on a railroad track.

10. The method of claim 1, wherein the position is a point on the ground.

11. The method of claim 1, wherein the measuring is contactless.

12. A system for determining the weight of a load when the load is placed on a chassis supported by a spring suspension, the system comprising:
at least one sensor mounted on the chassis for measuring a first distance ($d_1$) to a position fixed relative to the ground,
wherein the sensor is a millimeter wave (mmWave) radar, and wherein the position is a chassis structure that remains fixed under load;
a module for detecting a displacement (D) of the chassis relative to the position based on the first distance ($d_1$) and a second distance ($d_2$) measured to the position by the at least one sensor,
the module determining the weight ($W_L$) of the load on the basis of the chassis displacement (D); and
a communication module for communicating the determined weight ($W_L$) of the load.

13. The system of claim 12, wherein measuring the first distance ($d_1$) to the position occurs when the at least one sensor is initially mounted on the chassis, and the first distance ($d_1$) is stored in a memory.

14. The system of claim 12, wherein communicating the determined weight ($W_L$) of the load includes wirelessly transmitting the determined weight to a server.

15. The system of claim 12, wherein the chassis is supported by a multi-leaf spring suspension, and wherein the module determines the weight ($W_L$) of the load on the basis of the chassis displacement (D) by applying the function $W_L = aD^2 + bD + c$, where a, b and c are coefficients characteristic of the multi-leaf spring suspension.

16. The system of claim 15, wherein the coefficients characteristic of the multi-leaf spring suspension are derived from a chassis characterization training process.

17. The system of claim 12, wherein the module determines, prior to determining the weight ($W_L$) of the load, the presence of the load by determining that the magnitude of the chassis displacement (D) is greater than a minimum displacement value.

18. The system of claim 17, wherein the load is a shipping container, the module further:

determines the presence of a load contents inside the shipping container by determining that the determined weight ($W_L$) of the load is greater than an unloaded weight ($W_u$) of the shipping container; and determines the weight of the load contents by subtracting the unloaded weight ($W_u$) of the shipping container from the determined weight ($W_L$) of the load.

19. The system of claim 17, wherein the load is a load contents inside a shipping container permanently affixed to the chassis, the module further:

determines the presence of the load contents by determining that the determined weight ($W_L$) of the load is greater than an unloaded weight ($W_u$) of the shipping container; and determines the weight of the load contents by subtracting the unloaded weight ($W_u$) of the shipping container from the determined weight ($W_L$) of the load.

20. The system of claim 12, wherein the chassis is a rail car chassis, and wherein the position is a point on a railroad track.

21. The system of claim 12, wherein the position is a point on the ground.

22. The system of claim 12, wherein the measuring is contactless.

* * * * *